United States Patent
Nakamura et al.

(12) 
(10) Patent No.: US 8,762,791 B2
(45) Date of Patent: Jun. 24, 2014

(54) ERROR DETERMINATION DEVICE AND ERROR DETERMINATION METHOD OF CONTROL SYSTEM

(75) Inventors: Makoto Nakamura, Okazaki (JP); Takaya Soma, Anjo (JP); Masaki Kutsuna, Toyota (JP); Kensei Sakamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/575,498

(22) PCT Filed: Jan. 27, 2010

(86) PCT No.: PCT/JP2010/051010
§ 371 (c)(1),
(2), (4) Date: Jul. 26, 2012

(87) PCT Pub. No.: WO2011/092805
PCT Pub. Date: Aug. 4, 2011

(65) Prior Publication Data
US 2012/0297235 A1    Nov. 22, 2012

(51) Int. Cl.
*G06F 11/00* (2006.01)
(52) U.S. Cl.
USPC .......................................................... 714/45
(58) Field of Classification Search
CPC . G06F 11/07; G06F 11/0766; G06F 11/0784; G06F 11/0787; G06F 11/22; G06F 11/348; G06F 11/3466
USPC .................... 714/45, 44, 46, 47.1, 48
See application file for complete search history.

(56) References Cited

U.S. PATENT DOCUMENTS

| | | | | |
|---|---|---|---|---|
| 4,404,514 A | * | 9/1983 | Reichert, Jr. | 324/533 |
| 5,163,056 A | * | 11/1992 | Hagiwara et al. | 714/755 |
| 6,915,203 B2 | | 7/2005 | Maegawa et al. | |
| 2005/0055616 A1 | * | 3/2005 | Cuylen | 714/727 |

FOREIGN PATENT DOCUMENTS

| | | |
|---|---|---|
| JP | 1-106112 A | 4/1989 |
| JP | 6-86411 A | 3/1994 |
| JP | 6-137909 A | 5/1994 |
| JP | 9-160602 A | 6/1997 |
| JP | 11-288311 A | 10/1999 |
| JP | 2001-243082 A | 9/2001 |
| JP | 2003-232253 A | 8/2003 |
| JP | 2005-291102 A | 10/2005 |
| JP | 2006-057523 A | 3/2006 |
| WO | 0016060 A1 | 3/2000 |

OTHER PUBLICATIONS

International Search Report mailed Mar. 9, 2010 of PCT/JP2010/051010.

* cited by examiner

*Primary Examiner* — Dieu-Minh Le
(74) *Attorney, Agent, or Firm* — Kenyon & Kenyon LLP

(57) ABSTRACT

When a determination is made that a signal transmitted by a voltage sensor, a second voltage sensor, a current sensor, a temperature sensor, a second temperature sensor, a first CPU, a second CPU and a communication circuit is in error, a third CPU of a motor generator ECU determines that the control system is in error. When a determination is made that the control system is in error, the third CPU determines whether each of the voltage sensors, the current sensor, the temperature sensors, the first CPU, the second CPU and the communication circuit is in error or not.

4 Claims, 5 Drawing Sheets

FIG. 4

| VOLTAGE SENSOR | A/D CONVERTER | FIRST CPU | COMMUNICATION CIRCUIT | SECOND CPU | CONTROL SYSTEM | FAULTY SITE |
|---|---|---|---|---|---|---|
| ERROR | PROPER | PROPER | PROPER | PROPER | ERROR | VOLTAGE SENSOR |
| ERROR | ERROR | PROPER | PROPER | PROPER | ERROR | A/D CONVERTER |
| PROPER | PROPER | PROPER | ERROR | PROPER | ERROR | COMMUNICATION CIRCUIT |

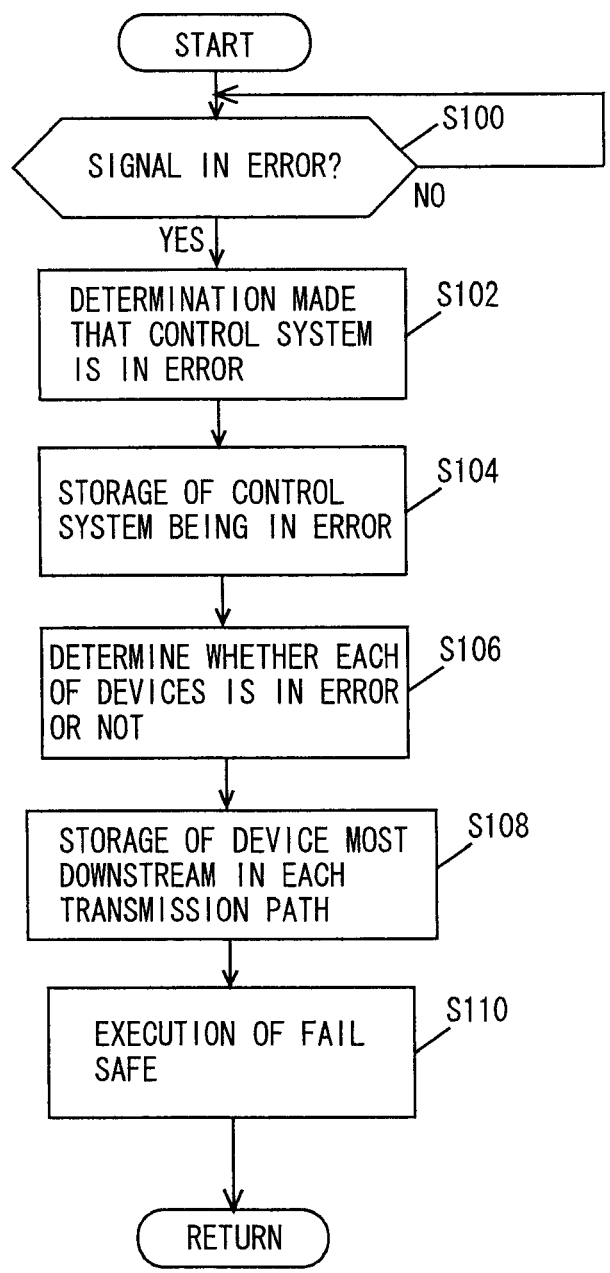

ERROR DETERMINATION DEVICE AND ERROR DETERMINATION METHOD OF CONTROL SYSTEM

This is a 371 national phase application of PCT/JP2010/051010 filed 27 Jan. 2010, the contents of which are incorporated herein by reference.

TECHNICAL FIELD

The present invention relates to an in error determination device and error determination method of a control system, particularly the technique of determining an error in a control system using a signal transmitted by a plurality of devices.

BACKGROUND ART

A vehicle is mounted with an ECU (Electronic Control Unit) for controlling devices such as the engine and automatic transmission. An ECU is a computer including a CPU (Central Processing Unit), a ROM (Read Only Memory), a RAM (Random Access Memory), and the like. Signals detected by various sensors such as an accelerator pedal position sensor, vehicle speed sensor, temperature sensor, voltage sensor and current sensor are processed by the ECU such that a command value towards a control subject is calculated.

If the signal processed by the ECU is in error, the vehicle cannot be controlled accurately. For the purpose of readily identifying a faulty site at a vehicle repair workshop or the like, it is required to store information identifying a faulty component in an RAM or the like in the ECU.

Japanese Patent Laying-Open No. 9-160602 (PTL 1) discloses a vehicle control system including a plurality of ECUs sharing control data. Each ECU determines whether the control data is proper or not, and storing, when an error is detected, all the control data obtained before and after the detection into a memory of the CPU.

CITATION LIST

Patent Literature

PTL 1: Japanese Patent Laying-Open No. 9-160602

SUMMARY OF INVENTION

Technical Problem

In addition to detecting whether a signal is in error or not, a determination as to whether the CPU, for example, per se is in error or not must be made. For example, the actual temperature detected by the temperature sensor is compared with the temperature estimated by the CPU to carry out a self-diagnosis of whether the CPU is in error or not. In the case where the CPU carries out a self-diagnosis, the signal received at the CPU must be determined as being proper. If the temperature sensor is faulty and the signal output from the temperature sensor is in error, identification of the CPU being in error cannot be made. Therefore, prior to the self-diagnosis by the CPU, a determination as to whether the temperature sensor is in error or not must be made. Therefore, for the eventual determination as to whether the control system formed of sensors, ECUs and the like is faulty or not, each device constituting the control system must be checked one by one in sequence to determine whether it is faulty or not. As a result, the time required to eventually determine whether the control system is faulty or not may become longer. The detection of an error may be delayed when there is an error in the control system.

An object of the present invention is to promptly detect an error in the control system, and identify the site with the error.

Solution to Problem

An error determination device determines an error in a control system using a signal transmitted by a plurality of devices. The error determination device includes a determination unit determining whether the control system is in error or not, and a storage unit storing that the control system is in error when a determination of the control system being in error is made. The determination unit determines whether a signal transmitted by a plurality of devices is in error or not, and when a determination is made that the signal transmitted by the plurality of devices is in error, determines that the control system is in error, and when a determination is made that the control system is in error, determines whether each of the plurality of devices is in error or not.

Advantageous Effects of Invention

When a signal employed in the control system is in error, a determination is made that the control system is in error prior to performing the step of determining whether each of the plurality of devices transmitting the signal is in error or not. Accordingly, an error in the control system can be detected promptly. Following the determination of the control system being in error, a determination is made as to whether each of the plurality of devices transmitting a signal is in error or not. Accordingly, the site with the error can be identified. Thus, an error in the control system can be detected promptly, and the site with the error can be identified.

BRIEF DESCRIPTION OF DRAWINGS

FIG. 4 shows devices stored as a device being in error.
FIG. 5 is a flowchart of a control configuration of a motor generator ECU.

DESCRIPTION OF EMBODIMENTS

Figure 1:
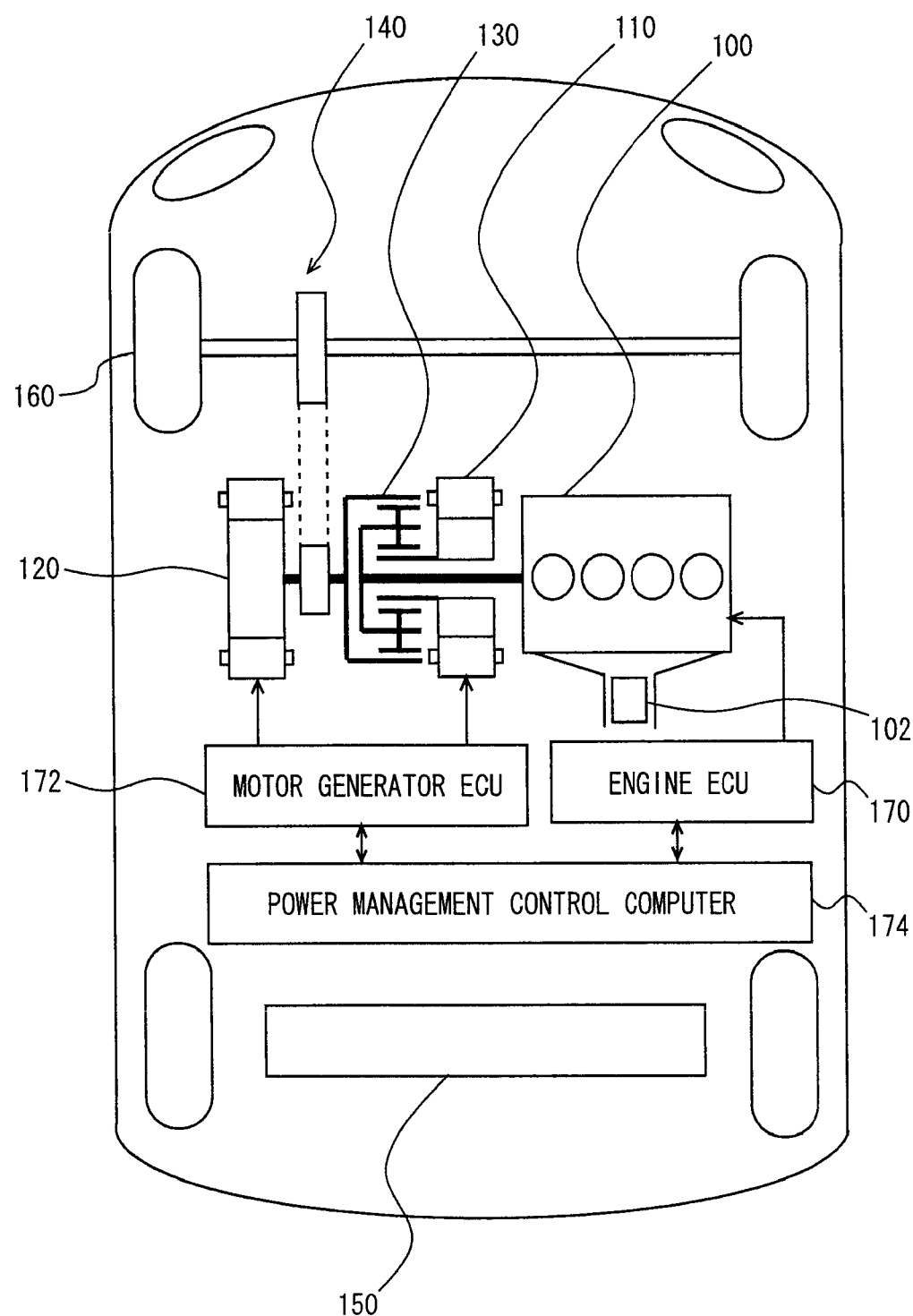
FIG. 1 is a schematic diagram of a configuration representing a hybrid vehicle.

An embodiment of the present invention will be described hereinafter with reference to the drawings. Hereinafter, the same elements have the same reference characters allotted, and their designation and function are also the same. Therefore, detailed description thereof will not be repeated.

Referring to FIG. 1, a hybrid vehicle is mounted with an engine 100, a first motor generator 110, a second motor generator 120, a power split mechanism 130, a speed reducer 140, and a battery 150. Although a hybrid vehicle will be described by way of example hereinafter, an electric automobile or a fuel cell car or the like may be employed instead of a hybrid vehicle. Moreover, a general vehicle having only an engine as the driving source may be employed.

Engine 100 is controlled by an engine ECU 170. First motor generator 110 and second motor generator 120 are controlled by a motor generator ECU 172. Engine ECU 170 and motor generator ECU 172 operate based on a command value from a power management control computer 174.

Engine ECU 170, motor generator ECU 172 and power management control computer 174 may be integrated.

The vehicle runs using the driving force from at least one of engine 100 and second motor generator 120. In other words, one or both of engine 100 and second motor generator 120 are automatically selected as the driving source according to the driving state.

For example, when the accelerator position is low and the vehicle speed is low, the hybrid vehicle runs using only second motor generator 120 as the driving source. Engine 100 is stopped in this case, unless the need of power generation or the like requires engine 100 to be driven.

In the case where the accelerator position is high, the vehicle speed is high, the remaining amount in battery 150 is low, or the like, engine 100 is driven. Under such circumstances, the hybrid vehicle runs using only engine 100, or both engine 100 and second motor generator 120 as the driving source.

Engine 100 is an internal combustion engine. The crankshaft that is the output shaft rotates by the mixture gas of fuel and air burning in the combustion chamber. The exhaust gas output from engine 100 is cleaned by a catalyst 102 to be discharged outside the vehicle. Catalyst 102 exhibits a cleaning effect by being warmed up to a specific temperature. The warming of catalyst 102 is carried out utilizing the heat of the exhaust gas. Catalyst 102 is, for example, a 3-way catalyst.

Engine 100, first motor generator 110 and second motor generator 120 are connected via power split mechanism 130. The motive power generated by engine 100 is split into two paths by power split mechanism 130. One path is directed to driving a front wheel 160 via speed reducer 140. The other path is directed to driving first motor generator 110 for generating power.

First motor generator 110 is a three-phase alternating current electric rotating machine including a U-phase coil, a V-phase coil, and a W-phase coil. First motor generator 110 generates electric power using the motive power of engine 100 that is split by power split mechanism 130. The electric power generated by first motor generator 110 is used depending on the running state of the vehicle or the remaining amount of charge in battery 150. For example, in the normal running mode, the electric power generated by first motor generator 110 is directly used as the electric power for driving second motor generator 120. On the other hand, when SOC of battery 150 is lower than a predetermined value, the electric power generated by first motor generator 110 is converted from alternating current into direct current by an inverter that will be described afterwards. Thereafter, the voltage is adjusted by a converter that will be described afterwards and stored in battery 150.

When first motor generator 110 acts as a power generator, first motor generator 110 generates negative torque. As used herein, negative torque refers to such torque that becomes a load on engine 100. When first motor generator 110 receives power supply and acts as a motor, first motor generator 110 generates positive torque. As used herein, positive torque refers to such torque that does not become a load on engine 100, that is, such torque that assists in rotation of engine 100. The same applies to second motor generator 120.

Second motor generator 120 is a three-phase alternating current electric rotating machine including a U-phase coil, a V-phase coil, and a W-phase coil. Second motor generator 120 is driven by at least one of the electric power stored in battery 150 and the electric power generated by first motor generator 110.

The driving force of second motor generator 120 is transmitted to front wheels 160 through speed reducer 140. Accordingly, second motor generator 120 assists engine 100 or allows the vehicle to run with the driving force from second motor generator 120. The rear wheels may be driven in place of or in addition to front wheels 160.

At the time of regenerative braking of the hybrid vehicle, second motor generator 120 is driven by front wheels 160 through speed reducer 140, so that second motor generator 120 operates as a power generator. Thus, second motor generator 120 operates as a regenerative brake that converts braking energy into electric power. The electric power generated by second motor generator 120 is stored in battery 150.

Power split mechanism 130 is formed of a planetary gear train including a sun gear, pinion gears, a carrier, and a ring gear. The pinion gears are engaged with the sun gear and the ring gear. The carrier supports the pinion gears such that they are rotatable on their own axes. The sun gear is coupled to the rotation shaft of first motor generator 110. The carrier is coupled to the crankshaft of engine 100. The ring gear is coupled to the rotation shaft of second motor generator 120 and speed reducer 140.

Engine 100, first motor generator 110, and second motor generator 120 are coupled via power split mechanism 130 formed of the planetary gear train, so that the rotational speeds of engine 100, first motor generator 110, and second motor generator 120 have the relation represented by a straight line in a nomographic chart.

Battery 150 is a battery pack configured such that a plurality of battery modules, each formed by integrating a plurality of battery cells, are connected in series. The voltage of battery 150 is, for example, about 200 V. A capacitor may be used in place of or in addition to battery 150.

Figure 2:
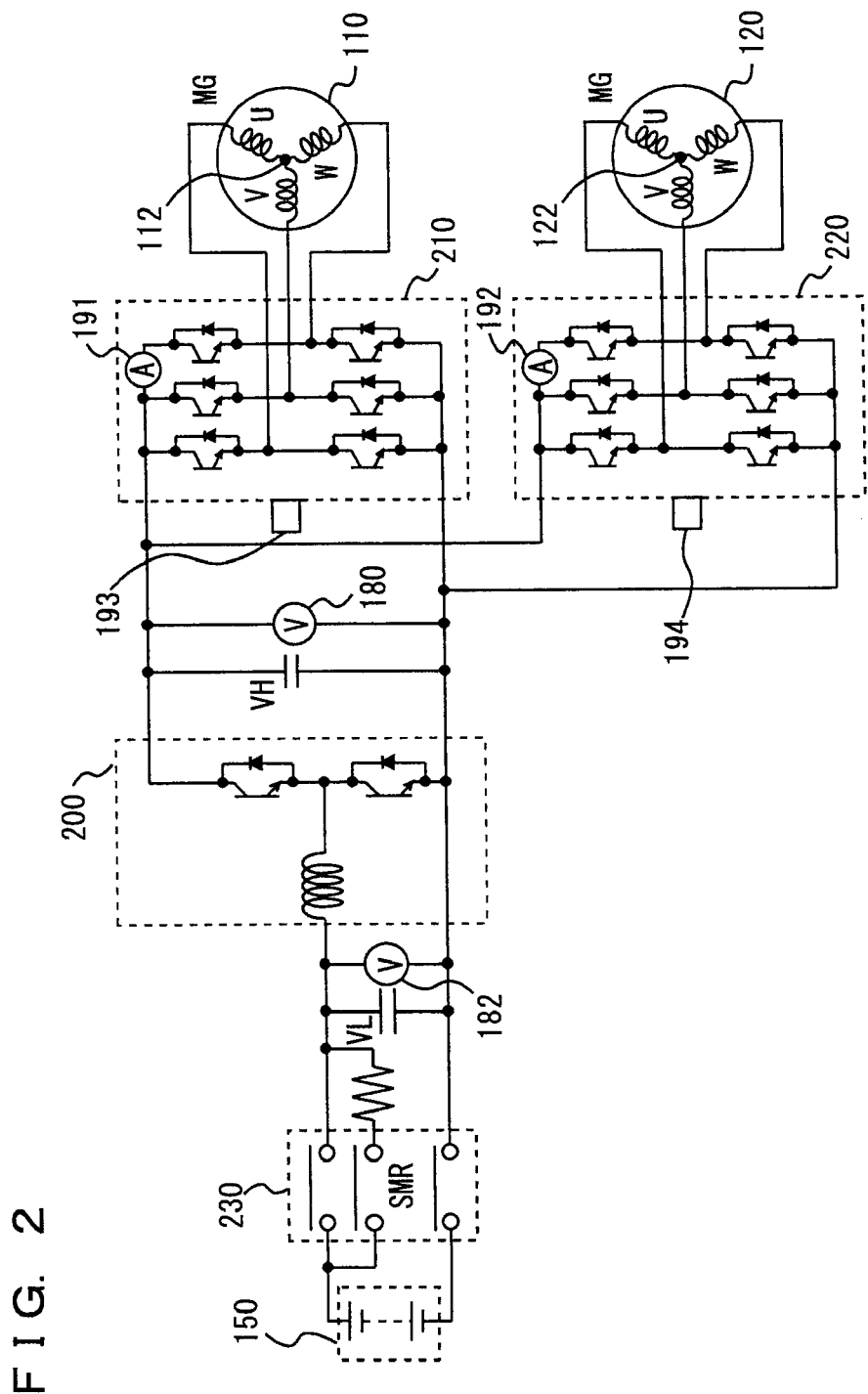
FIG. 2 represents an electrical system of a hybrid vehicle.

Referring to FIG. 2, an electrical system of the hybrid vehicle will be further described. Provided in the hybrid vehicle are a converter 200, a first inverter 210, a second inverter 220, and a system main relay 230.

Converter 200 includes a reactor, two npn transistors, and two diodes. The reactor has one end connected to the positive electrode side of each battery and the other end connected to a node between the two npn transistors.

The two npn transistors are connected in series. A diode is connected between the collector and the emitter of each npn transistor to allow current to flow from the emitter side to the collector side.

As the npn transistor, an IGBT (Insulated Gate Bipolar Transistor) can be used, for example. In place of the npn transistor, a power switching element such as a power MOSFET (Metal Oxide Semiconductor Field-Effect Transistor) can be used.

When the electric power discharged from battery 150 is supplied to first motor generator 110 or second motor generator 120, the voltage is boosted by converter 200. Conversely, when the electric power generated by first motor generator 110 or second motor generator 120 is to be supplied to battery 150, the voltage is decreased by converter 200.

A system voltage VH between converter 200 and each inverter is detected by a voltage sensor 180. A voltage VL between battery 150 and converter 200 is detected by a voltage sensor 182. The signals representing the detection results from voltage sensor 180 and voltage sensor 182 are sent to motor generator ECU 172.

First inverter 210 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. A diode is connected between the collector and the emitter of each npn transistor to allow current to flow from the emitter side to the collector side.

Then, the node between the npn transistors in each arm is connected to the end different from a neutral point 112 of each coil of first motor generator 110.

First inverter 210 converts direct current supplied from battery 150 into alternating current, which is supplied to first motor generator 110. First inverter 210 converts alternating current generated by first motor generator 110 into direct current.

Second inverter 220 includes a U-phase arm, a V-phase arm, and a W-phase arm. The U-phase arm, the V-phase arm, and the W-phase arm are connected in parallel. The U-phase arm, the V-phase arm, and the W-phase arm each have two npn transistors connected in series. A diode is connected between the collector and the emitter of each npn transistor to allow current to flow from the emitter side to the collector side. Then, the node between the npn transistors in each arm is connected to the end different from a neutral point 122 of each coil of second motor generator 120.

Second inverter 220 converts direct current supplied from battery 150 into alternating current and supplies the alternating current to second motor generator 120. Second inverter 220 converts alternating current generated by second motor generator 120 into direct current.

Converter 200, first inverter 210, and second inverter 220 are controlled by motor generator ECU 172.

In first inverter 210 and second inverter 220 are provide a current sensor 191 and a current sensor 192, respectively. Current sensor 191 detects the input/output current of first motor generator 110. Current sensor 192 detects the input/output current of second motor generator 120. The signals representing the detected results of current sensor 191 and current sensor 192 are applied to motor generator ECU 172.

In addition to current sensors 191 and 192, a temperature sensor 193 and a temperature sensor 194 are provided. Temperature sensor 193 detects the temperature of first inverter 210. Temperature sensor 194 detects the temperature of second inverter 220. The signals representing the detected results of temperature sensors 193 and 194 are applied to motor generator ECU 172.

System main relay 230 switches the state between battery 150 and converter 200 to a connected state and a cut off state. When system main relay 230 is in an open state, battery 150 is cut off from converter 200. When system main relay 230 is in a closed state, battery 150 is connected to converter 200.

Figure 3:
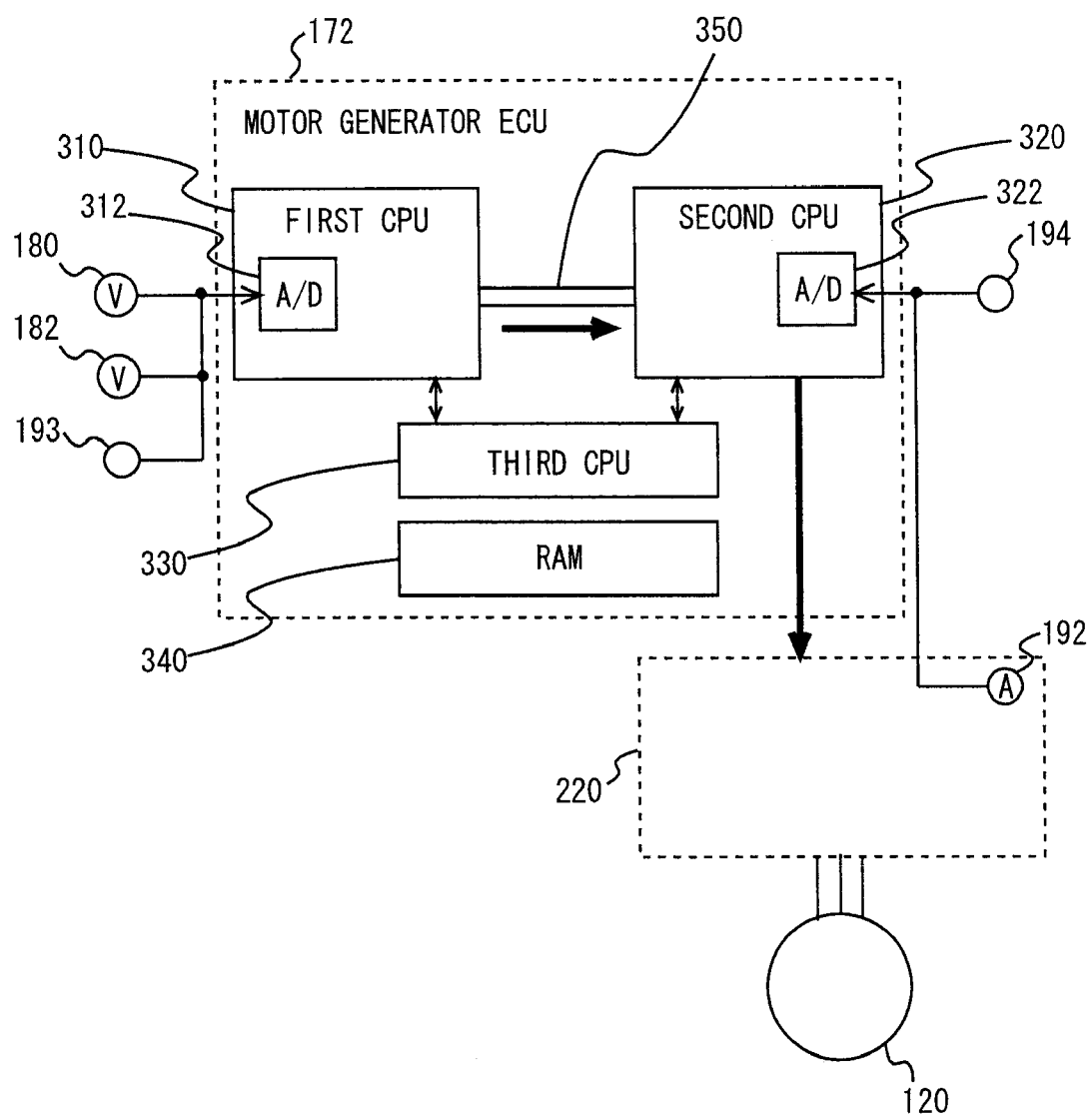
FIG. 3 represents an example of a control system.

Motor generator ECU 172 will be described in further detail with reference to FIG. 3. Motor generator ECU 172 includes a first CPU 310, a second CPU 320, a third CPU 330, a RAM 340, and a communication circuit 350.

By way of example, voltage sensor 180, voltage sensor 182, current sensor 192, temperature sensor 193, temperature sensor 194, first CPU 310, second CPU 320 and communication circuit 350 constitute the control system of second motor generator 120. The control system is not limited thereto.

First CPU 310 includes an analog/digital converter 312. Analog/digital converter 312 converts an analog signal transmitted from voltage sensor 180, voltage sensor 182, and temperature sensor 193 into a digital signal. First CPU 310 uses the signal transmitted from voltage sensor 180, voltage sensor 182, and temperature sensor 193 to control first inverter 210. For example, first CPU 310 generates a control signal to control first inverter 210 based on signals transmitted from voltage sensor 180, voltage sensor 182, and temperature sensor 193.

In the present embodiment, second CPU 320 receives the signal generated by voltage sensor 180, voltage sensor 182, and temperature sensor 193 via first CPU 310 and communication circuit 350.

Second CPU 320 includes an analog/digital converter 322. Analog/digital converter 322 converts an analog signal transmitted from current sensor 192 and temperature sensor 194 into a digital signal. Second CPU 320 uses the signal transmitted from voltage sensor 180, voltage sensor 182, current sensor 192, temperature sensor 193, and temperature sensor 194 to control second inverter 220 that is the control subject. Second CPU 320 controls the second motor generator by controlling second inverter 220. For example, second CPU 320 generates a control signal to control second inverter 220 based on the signal transmitted from voltage sensor 180, voltage sensor 182, current sensor 192, temperature sensor 193, and temperature sensor 194.

As set forth above, the signal generated by voltage sensor 180 is transmitted passing through voltage sensor 180, analog/digital converter 312, first CPU 310, communication circuit 350 and second CPU 320 in sequence.

The signal generated by voltage sensor 182 is transmitted passing through voltage sensor 182, analog/digital converter 312, first CPU 310, communication circuit 350 and second CPU 320 in sequence.

The signal generated by temperature sensor 193 is transmitted passing through temperature sensor 193, analog/digital converter 312, first CPU 310, communication circuit 350 and second CPU 320 in sequence.

The signal generated by current sensor 192 is transmitted in sequence passing through current sensor 192, analog/digital converter 322, and second CPU 320 in sequence.

The signal generated by temperature sensor 194 is transmitted passing through temperature sensor 194, analog/digital converter 322, and second CPU 320 in sequence.

Therefore, the control system includes five transmission paths through which signals are transmitted. The number of transmission paths corresponds to the number of sensors. The number of transmission paths is not limited thereto.

Third CPU 330 determines whether the control system is in error or not. For example, third CPU 330 determines whether the signal transmitted from voltage sensor 180, voltage sensor 182, current sensor 192, temperature sensor 193 and temperature sensor 194 to second CPU 320 is in error or not. A determination is made that the transmitted signal is in error when the value represented by the transmitted signal is equal to or greater than an upper limit or less than or equal to a lower limit. In the case where a signal is not transmitted to second CPU 320, a determination is made that the signal is in error. The method of detecting whether the signal is in error is not limited thereto.

Third CPU 330 determines that the control system is in error when a determination is made that the signal transmitted to second CPU 320 is in error. For example, when the duration of the determination of the signal being in error exceeds a predetermined time, a determination is made that the control system is in error. In the event of the control system being determined to be in error, a flag indicating that the control system is in error is turned ON to notify the ECUs other than motor generator ECU 172 as well as the computer that the control system is faulty.

Information indicating that the control system is in error is stored in RAM 340 to notify a worker at a repair workshop or the like using the diagnosis tool about the control system being in error. A non-volatile memory other than a RAM may be employed to store such information.

When a determination is made that the control system is in error, second CPU 320 executes a fail safe mode. For example, operation of second inverter 220 is prohibited. The fail safe mode is not limited thereto. The fail safe mode may be executed to allow the hybrid vehicle to run only at a low speed.

In the case where a determination is made that the control system is in error, third CPU 330 performs the step of determining whether each of voltage sensor 180, voltage sensor 182, current sensor 192, temperature sensor 193, temperature sensor 194, first CPU 310, second CPU 320, and communication circuit 350 is in error or not. Whether each of these devices is in error or not is determined without using signals transmitted from other devices. The method of detecting an error in each device can be carried out by the well-known common method. Therefore, details thereof will not be repeated here. Whether each of voltage sensor 180, voltage sensor 182, current sensor 192, temperature sensor 193, temperature sensor 194, first CPU 310, second CPU 320, and communication circuit 350 is in error or not may be determined using a plurality of CPUs. First CPU 310 and second CPU 320 may be set to carry out a self-diagnosis of whether in error or not. When an error is detected, a flag corresponding to each device is turned ON.

Among the devices determined to be in error, the device located most downstream in each signal transmission path is stored in RAM 340 as the faulty device. For example, information indicating the faulty device is stored in RAM 340. A non-volatile memory other than the RAM may be used to store such information.

When a determination is made that voltage sensor 180 is in error in the signal transmission path including, for example, voltage sensor 180, analog/digital converter 312, first CPU 310, communication circuit 350 and second CPU 320, as shown in FIG. 4, information indicating that the faulty device is voltage sensor 180 is stored in RAM 340. When a determination is made that voltage sensor 180 and analog/digital converter 312 are faulty, information indicating that the faulty device is analog/digital converter 312 is stored in RAM 340. In this case, upon analog/digital converter 312 attaining a proper state by the repair of first CPU 310, the information that the faulty device is voltage sensor 180 will be stored. In the case where a determination is made that communication circuit 350 is faulty, information indicating that the faulty device is communication circuit 350 is stored in RAM 340.

In a similar manner for the other transmission paths, information indicating the faulty device is stored in RAM 340.

A control configuration of motor generator ECU 172 will be described with reference to FIG. 5.

At step (hereinafter, step abbreviated as "S") 100, a determination is made as to whether the signal transmitted from voltage sensor 180, voltage sensor 182, current sensor 192, temperature sensor 193, and temperature sensor 194 is in error or not. When the transmitted signal is in error (YES at step S100), control proceeds to S102; otherwise (NO at S100), control returns to S100.

At S102, a determination that the control system is in error is provided. At S104, information that the control system is in error is stored.

At S106, a determination is made as to whether each of voltage sensor 180, voltage sensor 182, current sensor 192, temperature sensor 193, temperature sensor 194, first CPU 310, second CPU 320 and communication circuit 350 is in error or not.

At S108, the device located most downstream in the signal transmission path among the devices determined to be in error is stored as the faulty device. At S110, a fail safe mode is executed.

Thus, in the event of an error in a signal used by the control system, a determination is made that the control system is in error prior to performing the step of determining whether each of a plurality of devices through which the signal is transmitted is in error or not. Accordingly, the state of the control system being in error can be detected promptly. Following the determination of the control system being in error, the step of determining whether each of a plurality of devices transmitting the signal is in error or not is performed. Accordingly, the site with the error can be identified. Thus, an error in the control system can be detected promptly, and the site with the error can be identified.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

REFERENCE SIGNS LIST

100 engine; 102 catalyst; 110 first motor generator; 120 second motor generator; 130 power split mechanism; 140 speed reducer; 150 battery; 160 front wheel; 170 engine ECU; 172 motor generator ECU; 180, 182 voltage sensor; 191, 192 current sensor; 193, 194 temperature sensor; 200 converter; 210 first inverter; 220 second inverter; 230 system main relay; 310 first CPU; 312 analog/digital converter; 320 second CPU; 322 analog/digital converter; 330 third CPU; 340 RAM; 350 communication circuit.

The invention claimed is:

1. An error determination device of a control system using a signal transmitted by a plurality of devices comprising:
    a determination unit determining whether said control system is in error or not, and
    a storage unit storing that said control system is in error when a determination of said control system being in error is made,
    said determination unit configured to
    determine whether a signal transmitted by said plurality of devices in sequence is in error or not,
    when a determination is made that the signal transmitted passing through said plurality of devices in sequence is in error, determine that said control system is in error, and
    when a determination is made that said control system is in error, determine whether each of said plurality of devices is in error or not, wherein
    said storage unit stores a device located most downstream in said signal transmittal path among devices determined to be in error as the device in error.

2. The error determination device of a control system according to claim 1, wherein
    said plurality of devices include a control device using said signal,
    said control device executes a fail safe mode when a determination is made that said control system is in error.

3. An error determination method of a control system using a signal transmitted passing through a plurality of devices in sequence, said method comprising:
    determining whether a signal transmitted passing through said plurality of devices in sequence is in error or not;

when a determination is made that the signal transmitted by said plurality of devices in sequence is in error, determining that said control system is in error, when a determination is made that said control system is in error, determining whether each of said plurality of devices is in error or not; and storing a device located most downstream in said signal transmission path among devices determined to be in error as the device in error.

4. An error determination device of a control system using a signal transmitted passing through a plurality of devices in sequence, comprising:

a determination device for determining whether said control system is in error or not, and a storage device for storing that said control system is in error when a determination of said control system being in error is made, said determination device configured to determine whether a signal transmitted passing through said plurality of devices in sequence is in error or not;

when a determination is made that the signal transmitted passing through said plurality of devices in sequence is in error, determine that said control system is in error, and when a determination is made that said control system is in error, determine whether each of said plurality of devices is in error or not, wherein said storage device stores a device located most downstream in said signal transmission path among devices determined to be in error as the device in error.

\* \* \* \* \*